(12) United States Patent  
Gustafsson et al.

(10) Patent No.: US 7,948,451 B2
(45) Date of Patent: May 24, 2011

(54) INTERACTIVE METHOD OF PRESENTING INFORMATION IN AN IMAGE

(75) Inventors: Torbjörn Gustafsson, Linköping (SE); Per Carleberg, Stockholm (SE); Peter Sohlberg, Sollentuna (SE); Bo Persson, Stockholm (SE); Christina Aldrin, Stockholm (SE)

(73) Assignees: Totalförsvarets Forskningsinstitut, Stockholm (SE); Försvarets Materielverk, Stockholm (SE)

( * ) Notice: Subject to any disclaimer, the term of this patent is extended or adjusted under 35 U.S.C. 154(b) by 1031 days.

(21) Appl. No.: 11/629,868

(22) PCT Filed: Jun. 17, 2005

(86) PCT No.: PCT/SE2005/000936
§ 371 (c)(1),
(2), (4) Date: Dec. 18, 2006

(87) PCT Pub. No.: WO2005/124429
PCT Pub. Date: Dec. 29, 2005

(65) Prior Publication Data
US 2008/0024392 A1      Jan. 31, 2008

(30) Foreign Application Priority Data

Jun. 18, 2004   (SE) ...................................... 0401582

(51) Int. Cl.
*G09G 5/00*   (2006.01)
(52) U.S. Cl. .................. 345/8; 345/7; 345/633; 345/679
(58) Field of Classification Search .................. 345/7, 8, 345/679, 156, 633, 661, 676; 463/1–8; 715/700
See application file for complete search history.

(56) References Cited

U.S. PATENT DOCUMENTS

| | | | |
|---|---|---|---|
| 5,526,184 A * | 6/1996 | Tokuhashi et al. | 359/630 |
| 5,583,795 A | 12/1996 | Smyth | |
| 6,152,563 A | 11/2000 | Hutchinson et al. | |
| 6,278,418 B1 * | 8/2001 | Doi | 345/7 |
| 6,456,262 B1 * | 9/2002 | Bell | 345/8 |
| 6,822,643 B2 * | 11/2004 | Matsui et al. | 345/204 |
| 2002/0057280 A1 | 5/2002 | Anabuki et al. | |
| 2002/0075286 A1 * | 6/2002 | Yonezawa et al. | 345/679 |
| 2002/0126895 A1 | 9/2002 | Satoh | |
| 2003/0137524 A1 | 7/2003 | Anabuki et al. | |
| 2004/0051680 A1 * | 3/2004 | Azuma et al. | 345/8 |

FOREIGN PATENT DOCUMENTS

| | | |
|---|---|---|
| EP | 1 403 790 A2 | 3/2004 |
| GB | 2 348 520 A | 10/2000 |
| JP | 2000 152125 A | 5/2000 |

* cited by examiner

*Primary Examiner* — Alexander Eisen
*Assistant Examiner* — Viet Pham
(74) *Attorney, Agent, or Firm* — Jacobson Holman PLLC (57) ABSTRACT

An interactive method of presenting information in an image to a user, who carries a head-mounted display device that presents an image of the surroundings. The user's head position and direction are established in relation to the surroundings and a calculating device establishes, based on this, which part of the surroundings is positioned in front of the user's head. Furthermore, the calculating device establishes where in a chain of information the user is positioned and, based on this, presents information in the form of a virtual image which is mixed with the real image. A central part of the image is then defined and fields and/or objects outside this area are shown in a non-disturbing way until the user's gaze has left the central part. The user informs the calculating device that he/she has received the information and, respectively, performed the current operations by looking at the fields/objects.

19 Claims, 6 Drawing Sheets

INTERACTIVE METHOD OF PRESENTING INFORMATION IN AN IMAGE

This is a national stage of PCT/SE2005/000936 filed 17 Jun. 2005 and published in English.

BACKGROUND OF THE INVENTION

1. Field of the Invention

The present invention relates to an interactive method of presenting information in an image and, more specifically, a method allowing the user to interact with a system that mixes real and virtual information.

2. Description of the Related Art

In the future society, the technical systems will be increasingly complicated and interconnected in complex structures. At the same time the technical maintenance staff must be more generally usable than is the case now that a large number of specialists are employed. The maintenance staff will therefore need an intuitive technical support system which is easy to use.

Such a system can be based on Mixed Reality (MR) which comprises techniques and methods where real and virtual visual information are mixed. By approaching an object, the user of an MR system can, based on his own needs, have relevant information about the object projected in his field of vision. The information may concern a system or an individual component. It may also involve a performance operation, for instance, how a component is to be dismounted, or the tightening moment which is to be applied in mounting. The user can also via the MR system obtain support in fault localisation and have a corrective measure presented to himself.

The technical development has made it possible, and makes it possible to an increasing extent, for an individual to register with his senses virtually created information which to some extent corresponds to the information he is used to experience from reality. This means that it is possible to divide reality into two parts, the real world and the virtual world. The two worlds can be mixed by means of technical devices so that a user of such a technical device can perceive the two worlds as one.

In MR, the virtual and real worlds can thus be mixed. In a first step, it is possible to start from only mixing visual image information from the two worlds, but in a subsequent step, also acoustic and tactile/haptic information from the two worlds can be included. For the purpose of facilitating the understanding of the invention described below, the description is restricted mainly to comprise merely visual image information.

MR can be used in many different applications, such as for training, repair, maintenance and manufacture, in various fields, for instance in medicine, manufacturing industry, adventure industry and in military contexts.

SUMMARY OF THE INVENTION

The present invention provides a solution to the problem of presenting in each moment relevant information to a user, while taking the user's education level and previous experience into consideration, by designing the information in the manner described herein. Particularly, an interactive method of presenting information in an image to a user is described in which the user carries a head-mounted display device which presents an image of the surroundings to the user. The user's head position and direction are established in relation to the surroundings, and a calculating device establishes, based on the preceding step, which part of the surroundings is positioned in front of the user's head. The calculating device also establishes where in a hierarchical scheme the user is positioned as regards information about and performed operations concerning that part of the surroundings which is positioned in front of the user's head. Further, the calculating device establishes, based on the preceding step, which information is to be presented to the user and presents it in the form of a virtual image which is mixed with the real image. A central part of the image is defined, with there being in the area outside the central part fields and/or objects that are adapted to be included in a transfer of messages from the user to the calculating device. The user's direction of gaze at the image is established and it is made clear when the point of fixation in the image is in a field or an object. Finally, the calculating device is informed that the user has received the information and, respectively, performed the current operations depending on how the point of fixation is positioned in fields and/or objects.

BRIEF DESCRIPTION OF THE DRAWINGS

The invention will be described in more detail in the following with reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For the purpose of facilitating the understanding of the content of the invention, the further description is based on a concrete example which is called "live manual" and which describes a user who carries a technical device, in which the visual virtual and real worlds can be mixed and presented to him. His task is assumed to involve dismounting an engine block based on visual instructions. The technical steps of such a process will be described below.

Direct and Indirect Vision

Real visual information is the information that originates from the real world. Monitoring can be made directly, i.e. the visual radiation from the surroundings 3 reaches the user's eye 1 directly or via some kind of transmissive or partly transmissive optical device 2, for instance via a pair of goggles, see FIG. 1. Monitoring can also occur indirectly, for instance via a camera 4 and a display device 5, see FIG. 2. The camera here monitors the visual radiation from the surroundings, converts the radiation into an electric signal which is transferred to the display device where the signal is converted into an image that describes the surroundings. The camera 4 and the display device 5 can be designed in such a manner that they can be placed close to the user's head and eyes. In this case the camera follows the movements of the user's head, thus resulting in head-controlled indirect vision.

A camera used in such a context does not have to be sensitive to visual radiation only, but can be sensitive in other ranges as well, for instance in the near IR range, the thermal IR ranges or the UV range. The camera can also detect the surroundings by multispectral bands. By letting the camera be sensitive to radiation both inside and outside the reception area of the human eye, the indirect vision may help a user to perceive the surroundings in a more comprehensive manner than in the case using direct vision.

Since the camera monitors the surroundings and converts what it sees into an electric signal, it is possible to let this signal pass a computer which improves, changes or converts the image represented by the electric signal, for instance by noise reduction, contrast amplification or amplification of small local signal variations in shady or light areas.

Creating Virtual Visual Information

Virtual visual information is here information which is created by means of a computer or some other image-creating device. The virtual visual information is presented to the user via a display device 5. The virtual visual information can originate, for instance, from a database or be calculated by the computer. Examples of virtual visual information in this context are two-dimensional images (with image and/or text information), two-dimensional objects (for instance an arrow), three-dimensional text, three-dimensional models (objects), video sequences, particle systems (for instance flickering smoke/fire) and moving simulated animated sequences.

Mixing Virtual and Real Visual Image Information

The virtual visual information, described above, can be mixed with the real visual information using mainly two different techniques, optic-see-through and video-see-through.

Figure 1:
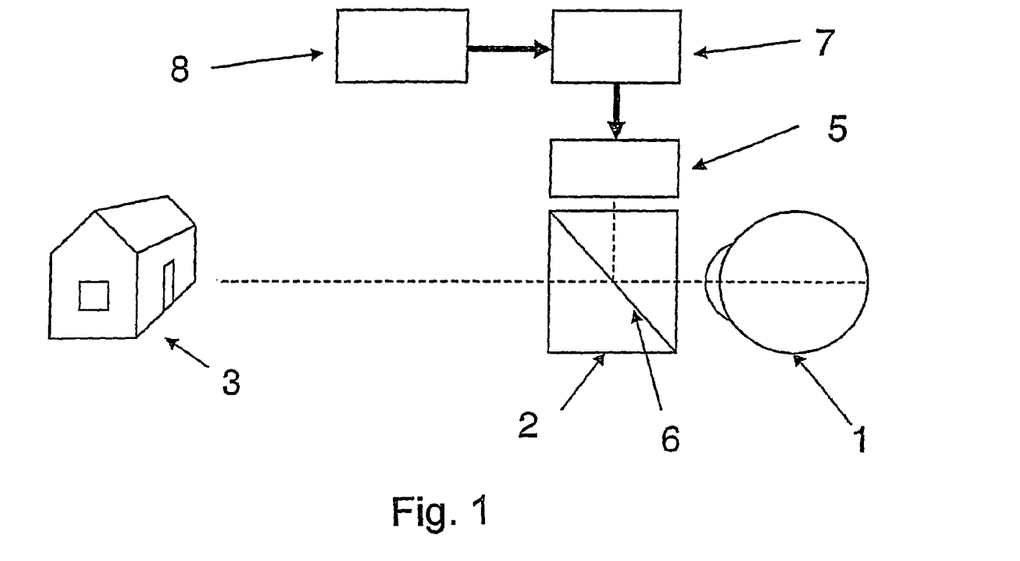
FIG. 1 shows direct vision and mixing of the reality and virtual information using what is called optic-see-through, FIG. 2 shows indirect vision via a camera and a display device and mixing of the reality and virtual information using what is called video-see-through, FIG. 3 shows six degrees of freedom for a user's head.

In the first technique, optic-see-through, see FIG. 1, the user sees the real visual world via a transmissive or partly transmissive optical device 2, into which the virtual visual information is reflected. The visual radiation which describes virtual image information is generated by a computer 7 based on line-up data from a line-up device 8. The virtual information is presented via a display device 5 and reflected into the user's eye via a beam splitter 6.

Figure 2:
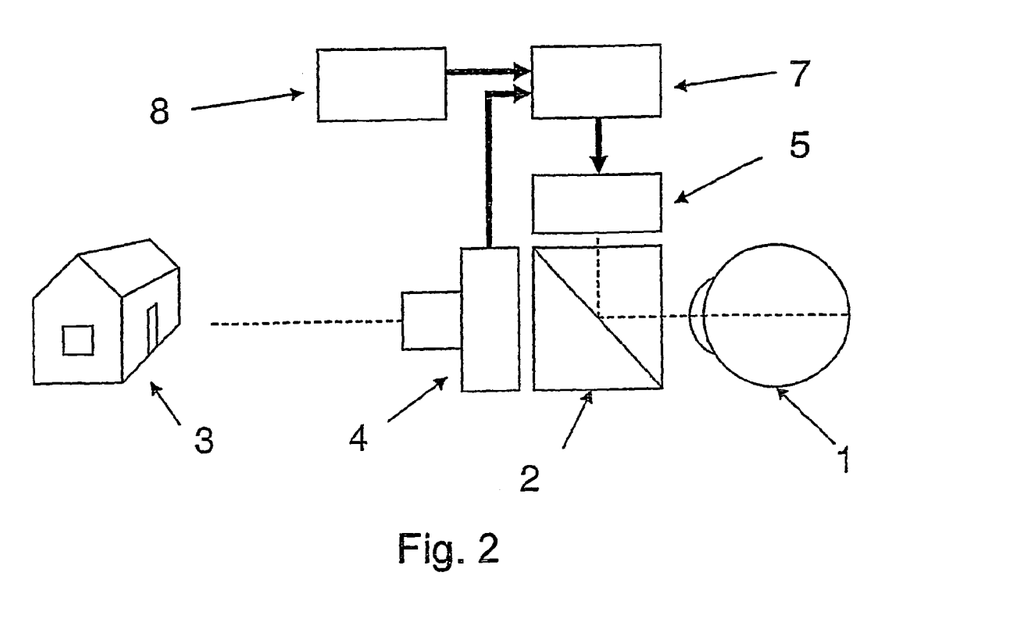

In the second technique, video-see-through, see FIG. 2, the user sees the real visual world via a camera 4 and a display device 5. The image from the camera passes a computer 7 or some other image-calculating unit before being presented to the user via the display device. The computer can then electronically or in a computerised manner intermix virtual visual information generated in the same way as in the preceding example based on line-up data from a line-up device 8. This intermixing can be made at different degrees, all the way from the virtual visual information being slightly superimposed over the real up to the virtual visual information replacing relevant real visual information.

Line-Up Process

For mixing of the virtual and real visual information to take place in a correct manner, some kind of line-up process must be used. The virtual visual information is in most cases related to a position in a scene in the real world; for instance virtual visual information describing how electric wires are placed in a wall is related to the position of the real wall, since otherwise the wires—virtually described—cannot be correctly superimposed on the wall, seen with the user's eyes.

Line-Up in Optic-See-Through

Starting from the user carrying head-mounted equipment for optic-see-through, the computer must somehow know in which direction the user has turned his head to be able to calculate which virtual visual information is to be presented and also how and where in the image in the display device this should occur. In an advanced form, also the position of the eye in relation to the position of the equipment is used, since the eye is the human image detector that records the mixed visual information. A minor displacement of the equipment on the user's head may result in the real and virtual visual information being displaced in an undesirable way.

There are many ways of lining up the user's position and direction in relation to a scene in the real world. Various techniques have been developed and line-up equipment, trackers, can be grouped according to which physical principle is used: acoustic, magnetic, based on the law of inertia, optical and mechanical. It is also possible to combine two trackers that are based on different principles and, thus, obtain a hybrid tracker.

Figure 3:
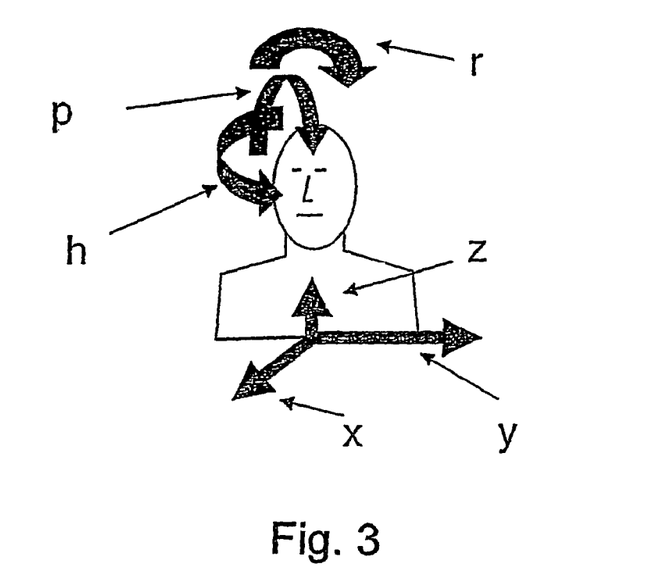

A user's relationship to his surroundings can be lined up by detecting both position, x, y and z, and direction, i.e. angles of rotation head, pitch and roll, see FIG. 3. In the figure head is designated h, pitch p and roll r. If position and direction in all directions are lined up, a line-up in six degrees of freedom has been made. In some cases, for instance when the user is sitting more or less strapped in a chair, it may be sufficient to measure only head, pitch and roll, i.e. only three degrees of freedom.

If a camera is integrated with the head-mounted equipment and the direction of the camera is aligned with the optical direction of the equipment, the camera image can be read by a computer which by means of software can detect patterns or local properties in the image and in this manner orient itself in the surroundings.

Line-Up in Video-See-Through

Starting from the user carrying head-mounted equipment for video-see-through, the information of the camera image can be used by the computer in the same way as described above regarding optic-see-through. The computer can thus detect local properties or patterns in the image from the camera and, based on this information, orient itself. A local property can be, for instance, the corner of a table or a nut. However, it may be difficult for the computer to find such local properties in the image from the camera since they can be viewed, for instance, from different angles of vision and in different lighting situations.

Figure 4:
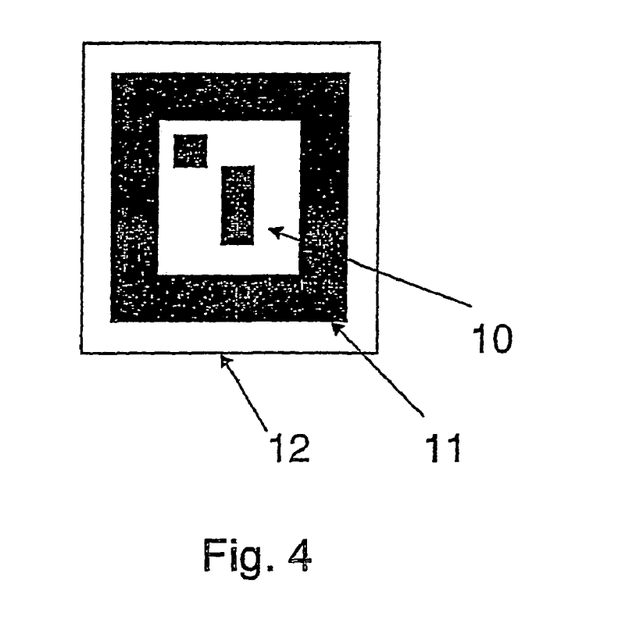
FIG. 4 shows an example of a marker with a unique pattern.

It is therefore suitable to assist the computer in orienting itself in the image by arranging patterns which have been specially designed to allow the computer to find them in the image from the camera. Such a specially designed pattern, hereinafter called a marker, should be designed so that the pattern of the marker is unique and the position and direction of the marker, i.e. its six degrees of freedom, can be determined from the marker. A marker, 9 in FIGS. 4 and 5, can simply be a black-and-white unique pattern 10, surrounded by a black frame 11 against a white background 12. A marker may also consist of a number of light-reflecting dots, a number of light-generating dots, for instance light-emitting diodes, or just be an ordinary image depicting something.

Figure 5:
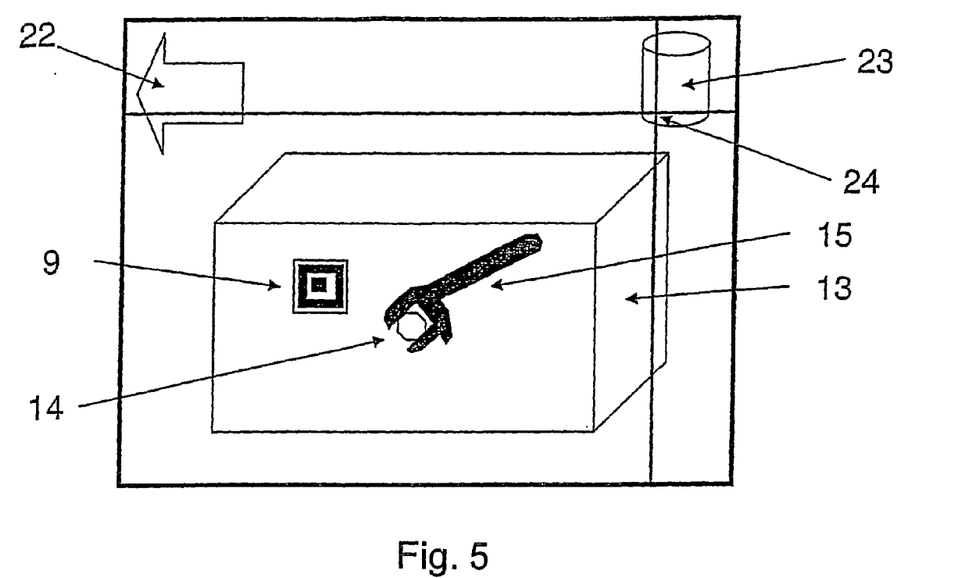
FIG. 5 shows a mixed image with a marker, a virtually created object and a real object and fields/objects inserted in the image, in which the point of fixation of the user's eyes can be positioned to indicate a function, and also a cross which indicates the point of fixation of the user's eyes in the image.

A marker can, in addition to assisting the computer in orienting itself, be connected to some kind of virtual visual information, or in a more general application to some other virtual information, for instance acoustic. Information about how and where the virtual visual information is to be presented to the user can also be connected to each marker. If, as shown in FIG. 5, a marker 9 is placed on an engine block 13 and in the vicinity of a bolt 14, the computer can, for instance, correctly position a virtually created spanner 15 to mark that the bolt is to be unscrewed by means of a spanner.

The computer can orient itself in the surroundings by detecting a marker in the camera image which is also seen by the user. As an alternative, the field of vision of the camera can be larger than the field of vision presented to the user via the display device. In such a case, the computer can find markers which are positioned wholly or partly outside the image presented to the user. In a further development, one or more cameras, which are arranged in a fixed and known relationship to the camera that gives the user his image, can be used to detect markers in a completely different direction from the direction in which the user directs his head. Owing to the known relationship between the cameras, relevant virtual visual image information can still be positioned in a correct manner in the image which the user sees.

Markers and Order of Execution

By using a number of different markers which are placed in different positions, for instance on an engine block, a user carrying a head-mounted video-see-through system connected to a computer can obtain a visual description how he should proceed, for instance, to dismount the engine. The user obtains a live manual.

Each marker is connected to some kind of virtual visual information and as the user approaches the current object, the engine block, of course all markers cannot provide virtual visual information simultaneously, but there must be a specific order regarding how the virtual visual information is to be displayed, i.e. how the various operations are to be performed, for example, in order to dismount the engine.

The invention is established in different chains of information, and the various manipulations that are to be performed by the user are arranged in chains of execution. It is a structure system where information at a certain level in a hierarchical system normally leads to new information. The user should also by messages to the calculating device be able to jump back and forth in the hierarchical system to obtain information he considers to be necessary.

Moreover the system can in a more advanced design adapt the information to the user's level of knowledge and experience. It is conceivable that the system presents "all" information on a first occasion to a certain user. If the user then is to repetitively perform the same manipulations on a sequence of objects, such as engines, the system can restrict the information step by step according to a predetermined plan of how the user's experience increases. However, as mentioned above the user can at any time request more information.

If besides a system is used which requires the user to identify himself, the system can also take into consideration what the user "should be able to perform" in consequence of what the user has performed on previous occasions. Since a system according to the invention must comprise an gaze tracker, see further below, to determine the point of fixation of an eye in the image, it would be possible to combine this with an opportunity to identify the user by eye recognition.

In the normal case, a marker is considered when determining which information is to be presented first when the entire marker is visible in the image. A more advanced system contains, however, several variants. A marker can be active/passive, executable/non-executable, acknowledged/unacknowledged etc.

The basic principle implies that a marker is active when positioned in the camera image, which usually is also the image presented via a head-mounted display device, and passive when positioned outside the image. As a rule, when a marker is active, the virtual information connected to the marker is shown whereas, when a marker is passive, no information at all is shown.

In a more developed system, a number of conditions can be introduced for a marker to be active, for instance it must be positioned within a certain distance to the user, it must have the correct priority, certain operations must be performed previously etc. In such a system, a passive marker can also, depending on the situation, show virtual information, such as "Do not perform this operation at the moment".

For the system to be able to correctly conduct a user, for instance, in a mounting sequence, certain operations must occur in the correct order. Therefore it has been found relevant to introduce the term acknowledgement of marker or, more correctly, acknowledgement of the information which is connected to the marker, so that the system, for example, can obtain information that a user has performed a certain operation/manipulation. After a user has performed a certain operation, he/she therefore acknowledges that he/she has been informed about or performed an operation associated with the information which is connected to the marker. This acknowledgement can occur by means of a command made, for instance, by the user's hand, voice or eye. For the user to be aware of the state of acknowledgement, a symbol can be connected to the marker which shows the status thereof. For example, it can be a symbol in the form of a hand where the colour thereof marks the current state of acknowledgement.

Interaction in Operations of Execution

Figure 6:
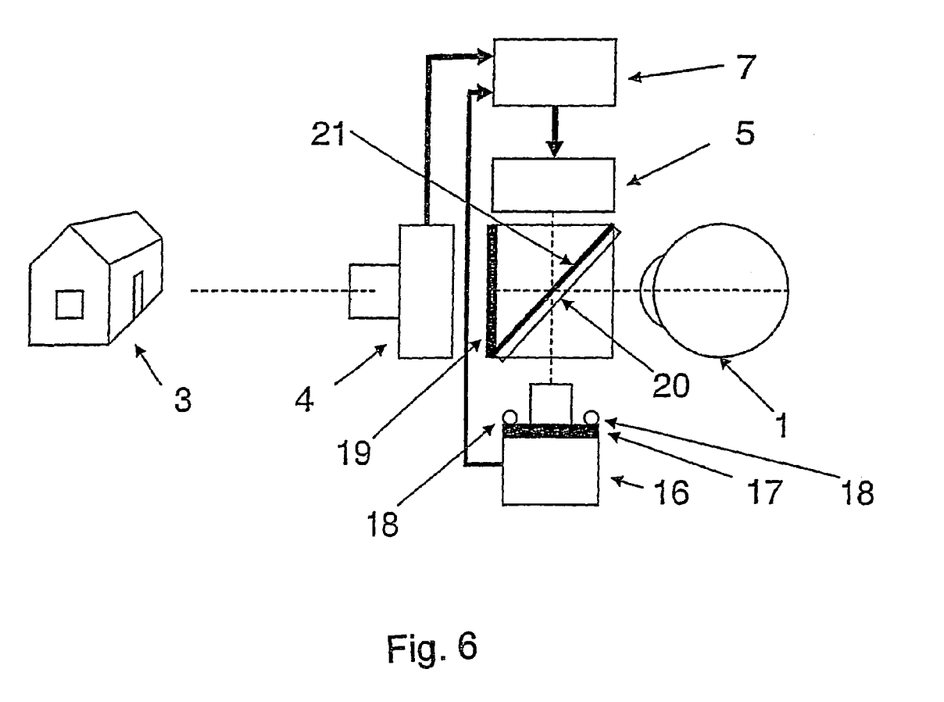
FIG. 6 shows an example of a head-mounted system for MR with an integrated gaze tracker.

The user carrying the head-mounted equipment and receiving instructions about how he/she should perform the various operations, for instance dismount the engine, has in most cases both hands occupied by the actual dismounting and besides his/her hands can be dirty. In this situation, the user must, as discussed above, be able to acknowledge somehow the various operations. Here the condition can be applied that the user already carries head-mounted equipment and supplement this with a gaze tracker (for one or both eyes), for instance as shown in FIG. 6. In the figure, the eye is designated 1, part of the surroundings 3, a camera 4, a display device 5, a computer 7, a camera 16 sensitive to near IR radiation, a filter 17 letting through only near IR radiation, near IR light sources 18, a spherical mirror 19, a hot mirror 20, i.e. an optical device having the function that near IR radiation is reflected as in a mirror while visual radiation is transmitted, and a beam splitter 21. If the direction of both eyes is detected, this can be used to create a correct stereographic virtual presentation, provided that a camera will be used for each eye, so that also the camera image is stereographic.

The gaze tracker, or the gaze trackers, detects where in the image the user has his point of fixation. A number of fields/objects are marked in the image from the camera—i.e. in the image of the surroundings, see FIG. 5. A field in the image is designated 22, a three-dimensional object in the image 23, and a cross 24, which describes where in the image the point of fixation of the eye is positioned.

The fields/objects, which suitably can be positioned close to the corners in the image and can be shaped in various ways, for instance as the arrow 22 in FIG. 5, for the function of the field/object to be understood immediately. The field/object can be shaped as a fully transparent surface in the image, surrounded by a coloured frame where the colour of the frame designates the current function. The function can also be indicated as an amount of text in the field/object. The field/object can also be more or less transparent or be completely filled with a colour, a pattern or an image. The field/object can also be three-dimensional, stationary or moving. When the user looks at one of the fields/objects, this can be indicated by the shape, colour, movement or contents of the field/object being changed somehow, so that the user understands that the system knows that the user looks at the field/object.

By interacting with a field/object, the user can acknowledge that he/she has received information, performed an action or requests stepwise movement in a hierarchical scheme of a sequence of execution comprised by the system. The actual command, the acknowledgement, can be given to the system in various ways. A simple way is to keep looking at a special field or object for a sufficient length of time. It is also possible to let the eye's passing of a number of fields/objects in a predetermined sequence give the current command. One way may involve letting the eye rapidly move to the periphery of the image and after that quickly to the field in which the user is interested. Another option is to let the position of the eye in a field or an object be combined with a completely different action, for instance a voice command or a command performed by some other part of the body than the eye, for instance the user's foot.

A field/object can also be positioned in different virtual focal planes if a camera and a display device are used for each eye. A field/object can be experienced to be close to the user or be experienced to be positioned far away owing to the stereo effect. It is here possible to let the various fields/objects take different distances, experienced by the user, to the user for the purpose of giving the user some kind of feedback.

When looking around, the user uses his head for large turnings and his eye for minor turnings. When a user uses gaze-controlled MR equipment and looks around, the point of fixation of his eye normally moves within a limited area around the centre of the image (his head makes the large movements). This can be applied so as not to have to show fields/objects before they are needed. It can be disturbing if there are fields/objects in the image when the user is not interested in being able to acknowledge or give a command, even if they are positioned at the edge of the image. In this case the user defines a central part of the image and not until the point of fixation of his eye leaves this central image, the fields/objects are shown.

It is still more disturbing if the point of fixation is always shown in the image. The invention therefore does not show the point of fixation in the image when it is positioned in the central part of the image, or shows it in a non-disturbing manner, for instance as a dot. Outside the central part, it is normally no problem to show the point of fixation, and it is important to know where one looks when one wants to interact with the fields/objects. With reference to FIG. 5 and designations in the same, one way can be to mark when the point of fixation 24 in the image is in a field 22 or an object 23 by the field/object changing its appearance, for instance colour or shape. Another way is to always present the point of fixation in the image in a distinct manner, for instance as a cross 24, when the point of fixation is outside the central part of the image.

It may also be important to know when the calculating device 7 has perceived a delivered message. This can occur by the current field/object 22, 23 changing its appearance, for instance colour or shape, as this occurs. It would also be possible to receive this information only by the image or a part thereof changing; for instance he next step in the chain of information or execution can be presented.

Figure 7:
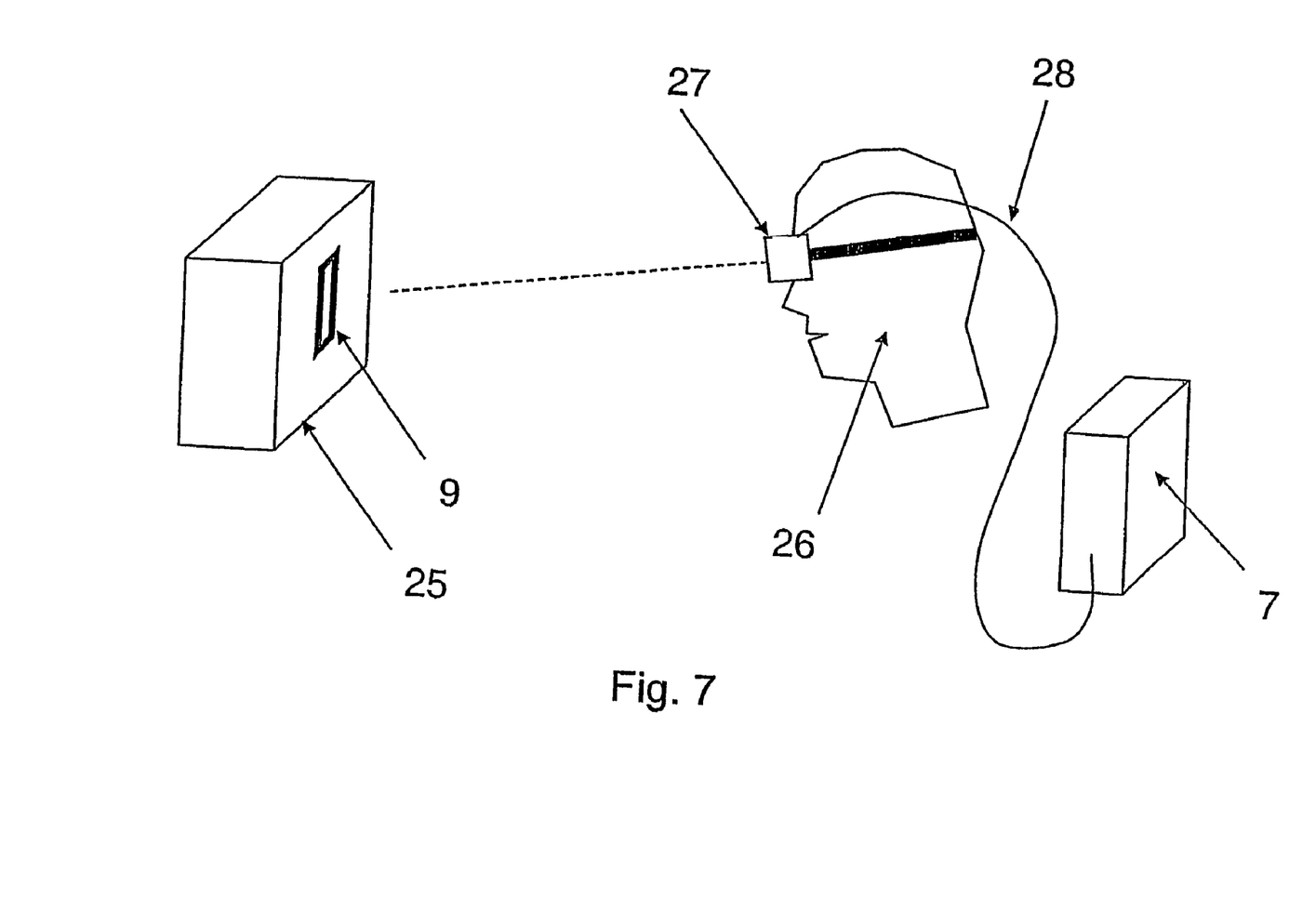
FIG. 7 is a general view of a concrete implementation of the invention.

As an example, a concrete implementation of the invention will be presented in the following. FIG. 7 shows how a marker 9 with a well-defined pattern is placed on a physical object 25. A user 26 has turned his head towards the physical object and the marker. On his head, the user has equipment 27, by means of which he can see both the real image information from the physical object and also superimposed virtual image information which is connected to the position and direction in relation to the marker.

With the head-mounted equipment 27, the user's eye can also be used for interaction between the user and a computer 7, in which software for gaze-controlled MR is implemented. The head-mounted equipment is connected to the computer by means of a wire 28 which contains several transmission channels and a current supply channel.

Figure 8:
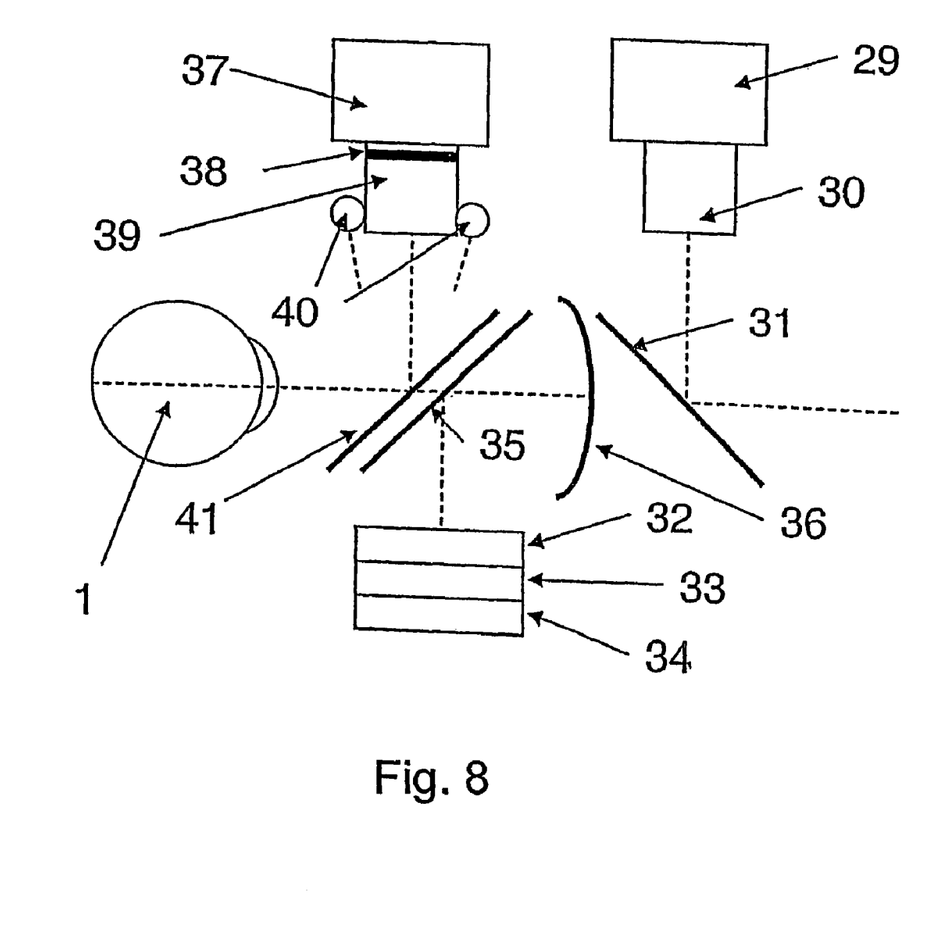
FIG. 8 shows the different parts that are included in the head-mounted equipment in FIG. 7.
Figure 9:
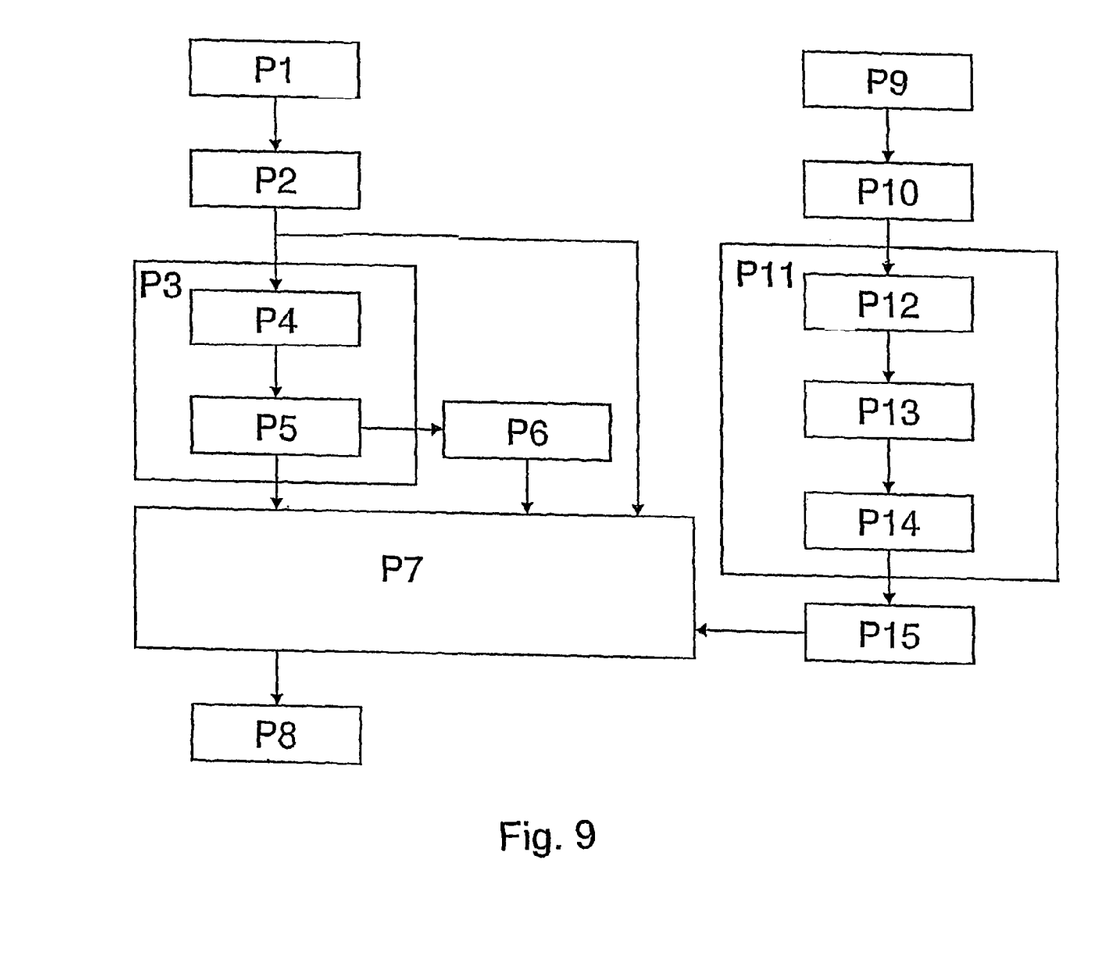
FIG. 9 is a flow chart showing how computer and software can operate in a system according to the invention.

FIG. 8, where the eye is designated 1, shows different parts included in the head-mounted equipment:
A camera system comprising:
Colour camera 29 with, for instance, FireWire interface
Lens 30 for colour camera 29
Mirror 31 for colour camera 29 and lens 30. The function of the mirror is to reduce parallax between the camera and a microdisplay system which will be presented below.
A microdisplay system comprising:
Microdisplay 32 of the transmissive type
Illumination 33 for microdisplay 32
Drive electronics 34 for microdisplay 32
Beam splitter 35
Spherical mirror 36
A gaze tracker system comprising:
Black-and-white camera 37 with good sensitivity in the near IR range. The camera can have, for example, FireWire interface.
Near IR filter 38 filtering off visual radiation
Lens 39 for camera 37
Near IR illumination 40 which on the one hand illuminates the eye 1 and, on the other, causes reflections on the cornea of the eye.
Hot mirror 41, i.e. mirror reflecting near IR radiation and transmitting visual radiation at an angle of incidence of approx 45 degrees FIG. 9 shows in the form of a flow chart how a computer and implemented software can operate in a system for gaze-controlled MR.

P1. Image information describing the reality, 9 and 25 in FIG. 7, and monitored by a camera, 29 in FIG. 8.
P2. The recorded image is transferred via wire 28 and FireWire interface to FireWire interface in the computer, 7 in FIG. 7.
P3. This image information then proceeds to marker detection which in turn consists of
P4. thresholding of image information and
P5. determining which marker is involved and the six degrees of freedom thereof.
P6. Information about which marker is sent to a database where virtual image information connected to markers is stored and
P7. the six degrees of freedom of the marker are sent to the computer graphics system where the image information from the camera (P1) is mixed with the virtual image information from the database (P6). How this mixing occurs is determined on the one hand by the six degrees of freedom of the marker from (P5) and, on the other hand, by information from the database (P6).

P8. The composite image information from the computer graphics system (P7) proceeds to the head-mounted equipment, 27 in FIG. 7, which contains, inter alia, a microdisplay system.

P9. At the same time the eye is monitored by a camera, 37 in FIG. 8.

P10. The monitored image is transferred via wire, 28 in FIG. 7, and FireWire interface to FireWire interface in the computer, 7 in FIG. 7.

P11. This image information then proceeds to detection of pupil and reflection which in turn consists of P12. filtering of image information, P13. thresholding of image information and P14. determining the position of the pupil and the positions of the reflections on the cornea caused by near IR illumination, 40 in FIG. 8.

P15. These position data are introduced into a system of equations from which the direction of the user's eye falls out. Eye direction data proceed to the computer graphics system (P7) where the point of fixation is marked, for instance as a cross in the image.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An interactive method of presenting information in an image to a user within surroundings, using a system in which the user carries a head-mounted display device which presents an image of the surroundings to the user, said system operating in accordance with at least one chain of information having associated manipulations arranged in at least one chain of execution that is performed by a user in a hierarchical sequence of steps to complete a task, said method comprising the steps of:

establishing the user's head position and direction in relation to the surroundings;

establishing, by a calculating device of said system based on the user's head position and direction, which part of the surroundings is positioned in front of the user's head as well as the user's direction of gaze;

establishing, by the calculating device, where the user is in a chain of information about the part of the surroundings that is positioned in front of the user's head, and where the user is in a chain of executed operations as regards the same part of the surroundings;

establishing, by the calculating device, on the basis of where the user is in the chain of information and where the user is in the chain of executed operations associated with said part of the surroundings, which information in the hierarchical sequence is next to be presented to the user and presenting the information in the form of a virtual image which is mixed with a real image as a mixed image that enables the user to perform a current operation as a next step within the hierarchical sequence for completing the task;

defining a central part of the mixed image, an area outside the central part including fields and/or objects that are shown in a way that is not disturbing to the user until the user's direction of gaze has left said central part of the image and that are adapted to be included in a transfer of messages from the user to the calculating device, said transfer of messages enabling the user to move back and forth in the hierarchical sequence to obtain information needed to perform the current operation; and the calculating device being informed that the user has received the information and, respectively, performed the current operation based on how the user's direction of gaze is positioned in one or more of the fields and/or objects such that the user, by changing the user's direction of gaze, initiates said transfer of messages to the calculating device;

recognizing, by said calculating device, said transfer of messages and establishing, in response to said transfer of messages, which information in said chain of information is next to be presented to the user to enable the user to perform a next step within the hierarchical sequence; and presenting, by the calculating device, information relating to the next step in said hierarchical sequence making up said chain of executed operations for performance by said user to complete said task.

2. The method as claimed in claim 1, further comprising marking when the user's direction of gaze in the mixed image is in a field or an object by said field or said object changing its appearance.

3. The method as claimed in claim 1, wherein the user's direction of gaze is presented in a distinct manner when the user's direction of gaze is positioned outside the central part of the image, said direction of gaze being either not presented or presented in a non-disturbing manner when said direction of gaze is in the central part of the image.

4. The method as claimed in claim 1, further comprising perceiving by the calculating device when the user has delivered a message by changing the user's direction of gaze to a field or an object outside said central part, said field or said object serving as an input mechanism by which the user sends said message, said calculating device changing an appearance of said field or said object outside said central part to acknowledge that the message was received.

5. The method as claimed in claim 1, wherein the head-mounted display device mixes the real image and the virtual image using an "optic-see-through" technique.

6. The method as claimed in claim 1, wherein the head-mounted display device mixes the real image and the virtual image using a "video-see-through" technique.

7. The method as claimed in claim 2, wherein said change of appearance of said field or said object includes a change in color or shape.

8. The method as claimed in claim 3, wherein the user's direction of gaze is presented as a cross when a point of fixation is outside said central part of the image.

9. The method as claimed in claim 4, wherein said change of appearance of said field or said object includes a change in color or shape.

10. An interactive method of presenting information in an image to a user who is positioned within surroundings, using a system in which the user carries a head-mounted display device which presents an image of the surroundings to the user, said system operating in accordance with at least one chain of information having associated manipulations arranged in at least one chain of execution that is performed by a user in a predefined hierarchical sequence of steps to complete a task, said method comprising the steps of:

establishing the user's head position and direction in relation to the surroundings;

establishing, by a calculating device of said system, a part of the surroundings that is positioned in front of the user's head and the user's direction of gaze;

establishing, by the calculating device with respect to the part of the surroundings positioned in front of the user's head, where the user is in a chain of information about said part of the surroundings and where the user is in a chain of operations to be executed that relate to said part of the surroundings;

determining, by the calculating device, which information in the chain of information is next to be presented to the user based on where the user is in the chain of information and where the user is in the chain of operations to be executed;

presenting the information to the user in the form of a virtual image which is mixed with a real image as a mixed image that enables the user to perform a current operation as a next step within the hierarchical sequence of step to complete the task;

defining a central part of the mixed image according to the user's direction of gaze, an area outside the central part including fields and/or objects that are not shown in a way that would be disturbing to the user until the user's direction of gaze has left said central part of the image; and said calculating device being informed that the user has received the information and/or performed the operation from said chain of operations to be executed by said user sending an acknowledgment signal that is recognized by said calculating device.

11. The method as claimed in claim 10, wherein said user sends said acknowledgment signal by looking at a field or an object outside said central part, said field or said object serving as an input mechanism for the user to send said acknowledgment signal, and further comprising marking, by said system, when the calculating device has perceived a delivered acknowledgment signal by the field or the object outside said central part changing its appearance.

12. The method as claimed in claim 11, wherein said change of appearance of said field or said object includes a change in color or shape.

13. The method as claimed in claim 10, further comprising marking, by the system, when the user's direction of gaze in the mixed image is in a field or an object by said field or said object changing its appearance.

14. The method as claimed in claim 13, wherein said change of appearance of said field or said object includes a change in color or shape.

15. The method as claimed in claim 10, wherein the user's direction of gaze is presented in a distinct manner when the user's direction of gaze is positioned outside the central part of the image, said direction of gaze being either not presented or presented in a non-disturbing manner when said direction of gaze is in the central part of the image.

16. The method as claimed in claim 10, wherein the head-mounted display device mixes the real image and the virtual image using an "optic-see-through" technique.

17. The method as claimed in claim 10, wherein the head-mounted display device mixes the real image and the virtual image using a "video-see-through" technique.

18. The method as claimed in claim 10, wherein said sending of the acknowledgment signal includes movement of the user's direction of gaze relative to one or more fields and/or objects in a specific pattern or by gazing at a particular field or object for a specified time.

19. The method as claimed in claim 10, further comprising, after said calculating device has perceived a delivered acknowledgment signal, the step of said calculating device presenting a next step in the chain of information or chain of operations to be executed in response to said acknowledgment signal.

* * * * *